(12) United States Patent
Chen

(10) Patent No.: US 7,301,764 B2
(45) Date of Patent: Nov. 27, 2007

(54) ELECTRONIC DEVICE WITH AUDIO CAPABILITY

(75) Inventor: Min-Tai Chen, Taipei (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 120 days.

(21) Appl. No.: 11/286,488

(22) Filed: Nov. 23, 2005

(65) Prior Publication Data

US 2007/0115631 A1    May 24, 2007

(51) Int. Cl.
*H05K 7/20* (2006.01)

(52) U.S. Cl. ............... 361/694; 361/683; 361/690; 361/692; 381/163; 381/333; 455/90.3; 455/575.1

(58) Field of Classification Search ........ 361/680–686, 361/752, 784, 785, 787; 381/87, 88, 190, 381/192, 332, 333, 337, 338, 350, 300–304, 381/160, 334–336, 386–388; 181/177, 179, 181/182, 196, 198, 152, 156, 199; 455/575.1–575.9, 455/550.1, 569.1, 569.2, 570, 420.01–420.04
See application file for complete search history.

(56) References Cited

U.S. PATENT DOCUMENTS

| | | | | |
|---|---|---|---|---|
| 5,790,679 A | * | 8/1998 | Hawker et al. ............. | 381/163 |
| 5,805,708 A | * | 9/1998 | Freadman ................... | 381/345 |
| 5,821,471 A | * | 10/1998 | McCuller ..................... | 181/156 |
| 5,930,376 A | * | 7/1999 | Markow et al. ............ | 381/333 |
| 6,061,460 A | | 5/2000 | Seo | |
| 6,067,224 A | * | 5/2000 | Nobuchi ..................... | 361/683 |
| 6,792,126 B2 | * | 9/2004 | Okuno et al. .............. | 381/412 |
| 6,807,053 B2 | * | 10/2004 | An et al. ..................... | 361/683 |
| 7,092,745 B1 | * | 8/2006 | D'Souza .................. | 455/575.1 |
| 7,136,625 B2 | * | 11/2006 | Ylitalo et al. ............. | 455/90.3 |
| 2002/0187758 A1 | | 12/2002 | Ylitalo et al. | |
| 2005/0190941 A1 | | 9/2005 | Yang | |
| 2005/0233781 A1 | * | 10/2005 | Erixon et al. ............ | 455/575.1 |

FOREIGN PATENT DOCUMENTS

| | | |
|---|---|---|
| DE | 19534741 | 9/1996 |
| DE | 69706223 T | 12/2001 |
| DE | 69725222 T | 5/2004 |
| EP | 0 909 077 A2 | 4/1999 |
| EP | 0909077 A2 * | 4/1999 |
| EP | 1 324 177 A1 | 7/2003 |
| FR | 2 783 652 * | 9/1998 |
| GB | 2 403 090 A | 12/2004 |
| TW | 247238 B1 * | 1/2006 |

* cited by examiner

*Primary Examiner*—Michael Datskovskiy
(74) *Attorney, Agent, or Firm*—Quintero Law Office

(57) ABSTRACT

A speaker module is disposed on the top casing and includes at least one first vent. A printed circuit board is disposed between the top casing and the bottom casing and includes at least one second vent corresponding to the first vent.

14 Claims, 2 Drawing Sheets

ELECTRONIC DEVICE WITH AUDIO CAPABILITY

BACKGROUND

The invention relates to an electronic device with audio capability, and in particular to a notebook computer with improved audio output.

Conventionally, a notebook computer provides speakers to output sound. The speakers are often disposed in a host of the notebook computer. Specifically, the host of the notebook computer comprises a top casing and a bottom casing. The speakers are disposed on the top casing, and a printed circuit board (or a main board) is disposed between the top casing and the bottom casing. As bottom ends of the speakers are often separated from the printed circuit board by a small distance, the space of a sound box between each speaker and the printed circuit board is small or air elasticity therebetween poor. Accordingly, when the speakers operate, a diaphragm in each speaker is not easily vibrated due to the insufficient space of the sound box or air elasticity. Namely, resonance is not easily generated between the diaphragm in each speaker and air. Sound magnitude from the speakers and audio quality provided thereby are thus adversely affected.

To increase volume from the speakers, portions, under and corresponding to the speakers, of the printed circuit board are removed. Accordingly, the space of the sound box or air elasticity under the speakers is increased, increasing the volume from the speakers.

Nevertheless, in the limited space provided by the host of the notebook computer, arrangement of the printed circuit board and electronic members is difficult. Layout of circuits on the printed circuit board is further complicated when portions thereof are removed.

Hence, there is a need for a notebook computer with improved audio output or an electronic device with audio capability. Volume from a speaker module of the notebook computer or electronic device is increased when layout of circuits on a printed circuit board thereof is less influenced.

SUMMARY

Accordingly, an exemplary embodiment of the invention provides a notebook computer with improved audio output. The notebook computer comprises a monitor, a host, a speaker module, and a printed circuit board. The host pivots the monitor and comprises a top casing and a bottom casing opposite thereto. The speaker module is disposed on the top casing and comprises at least one first vent. The printed circuit board is disposed between the top casing and the bottom casing and comprises at least one second vent corresponding to the first vent.

The projected size of the first vent on the printed circuit board is substantially equal to the size of the second vent.

The projected size of the first vent on the printed circuit board is less than the size of the second vent.

The projected profile of the first vent on the printed circuit board is substantially equal to the profile of the second vent.

The speaker module further comprises a speaker body opposing the printed circuit board.

The notebook computer further comprises a sound box body disposed between the second vent and the bottom casing.

DESCRIPTION OF THE DRAWINGS

The invention can be more fully understood by reading the subsequent detailed description and examples with references made to the accompanying drawings, wherein.

DETAILED DESCRIPTION

Figure 1:
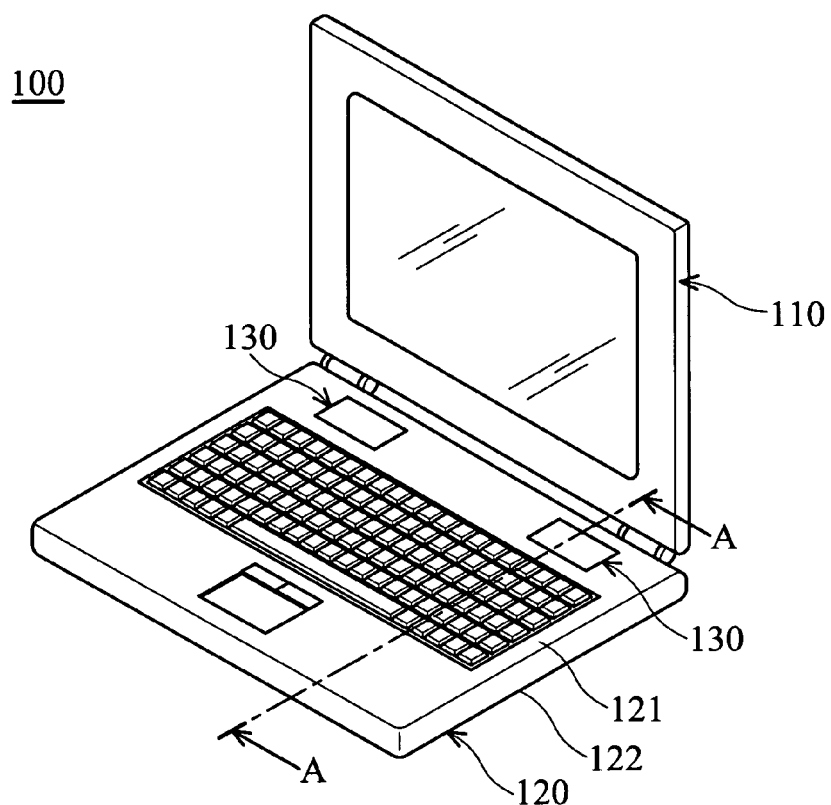
FIG. 1 is a schematic perspective view of a notebook computer with improved audio output.
Figure 2:
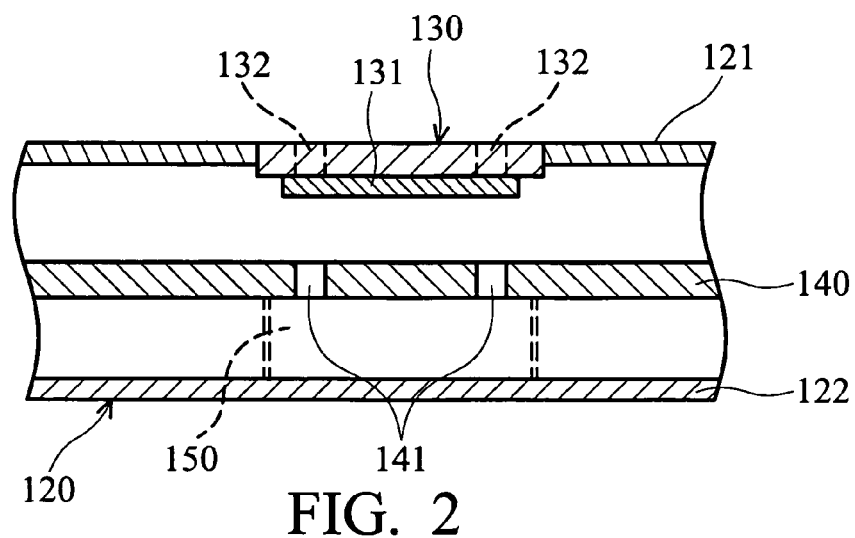
FIG. 2 is a partial cross section taken along line A-A of FIG. 1.

Referring to FIG. 1 and FIG. 2, an embodiment of an electronic device with audio capability may be a notebook computer 100 with improved audio output. The notebook computer 100 comprises a monitor 110, a host 120, two speaker modules 130, and a printed circuit board (or main board) 140.

Figure 3:
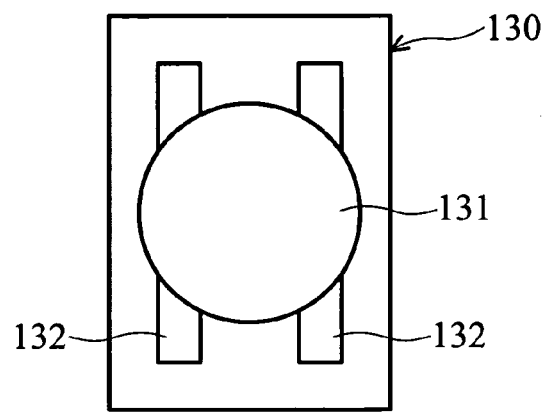
FIG. 3 is a schematic bottom view of a speaker module of the notebook computer with improved audio output.
Figure 4:
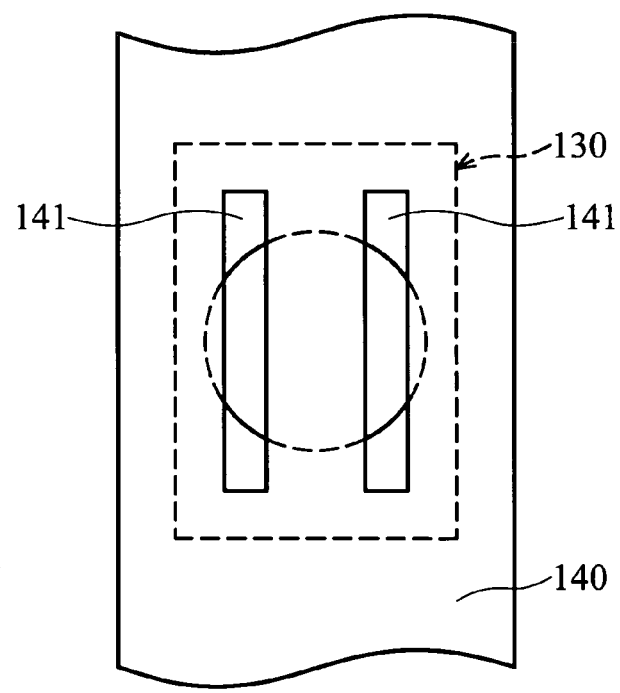
FIG. 4 is a schematic bottom view of a printed circuit board of the notebook computer with improved audio output.

The host 120 pivots the monitor 110 and comprises a top casing 121 and a bottom casing 122 opposite thereto. The speaker modules 130 are disposed on the top casing 121 of the host 120. As shown in FIG. 2 and FIG. 3, each speaker module 130 comprises a speaker body 131 and two first vents 132. The speaker body 131 opposes the printed circuit board 140. As shown in FIG. 2 and FIG. 4, the printed circuit board 140 is disposed between the top casing 121 and the bottom casing 122 of the host 120 and comprises two second vents 141 formed thereon and corresponding to each speaker module 130. Specifically, the second vents 141 of the printed circuit board 140 oppose the first vents 132 of the speaker module 130, and the projected size of each first vent 132 on the printed circuit board 140 is substantially equal to the size of each second vent 141. The profiles of the first vents 132 and second vents 141 can be determined according to the configuration of the speaker module 130, and the projected profile of the first vents 132 on the printed circuit board 140 substantially equal to the profile of the second vents 141. In this embodiment, the profiles of the first vents 132 and second vents 141 are substantially rectangular.

Accordingly, even though a bottom end of the speaker module 130 (or speaker body 131) is separated from the printed circuit board 140 by a small distance, flow of air is enhanced by the second vent 141 on the printed circuit board 140. Namely, air elasticity between the speaker module 130 and the printed circuit board 140 is enhanced. Additionally, by the second vents 141 on the printed circuit board 140, a sound box under the speaker module 130 is extended to the bottom casing 122 of the host 120. Accordingly, when the speaker module 130 operates, a diaphragm (not shown) in the speaker body 131 is easily vibrated because of the increased space of the sound box or air elasticity. Namely, resonance is easily generated between the diaphragm in the speaker body 131 and air, increasing volume from the speaker module 130 and promoting audio quality provided thereby.

Moreover, as shown in FIG. 2, a sound box body 150 can be, if possible, disposed between the second vent 141 of the printed circuit board 140 and the bottom casing 122 of the host 120. Accordingly, resonance is also easily generated between the diaphragm in the speaker body 131 and the air, further promoting the audio quality provided by the speaker module 130.

The disclosed electronic device with audio capability is not limited to a notebook computer, and may be a PDA or MP3 having only a host. The structure of the host of the PDA or MP3 can be the same as that of the host 120 of the notebook computer 100.

In conclusion, volume from the speaker module 130 of the notebook computer 100 with improved audio output or electronic device with audio capability is increased when layout of circuits on the printed circuit board 140 thereof is less influenced.

While the invention has been described by way of examples and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A notebook computer with audio capability, comprising:
    a monitor;
    a host pivoting the monitor and comprising a top casing and a bottom casing opposite thereto;
    a speaker module disposed on the top casing and comprising at least one first vent; and
    a printed circuit board disposed between the top casing and the bottom casing and comprising at least one second vent corresponding to the first vent, wherein the projected size of the first vent on the printed circuit board is not greater than the size of the second vent.

2. The notebook computer as claimed in claim 1, wherein the projected size of the first vent on the printed circuit board is substantially equal to the size of the second vent.

3. The notebook computer as claimed in claim 1, wherein the projected size of the first vent on the printed circuit board is less than the size of the second vent.

4. The notebook computer as claimed in claim 1, wherein the projected profile of the first vent on the printed circuit board is substantially equal to the profile of the second vent.

5. The notebook computer as claimed in claim 1, further comprising a sound box body disposed between the second vent and the bottom casing.

6. An electronic device with audio capability, comprising:
    a host comprising a top casing and a bottom casing opposite thereto;
    a speaker module disposed on the top casing and comprising at least one first vent; and
    a printed circuit board disposed between the top casing and the bottom casing and comprising at least one second vent corresponding to the first vent, wherein the projected size of the first vent on the printed circuit board is not greater than the size of the second vent.

7. The electronic device as claimed in claim 6, wherein the projected size of the first vent on the printed circuit board is substantially equal to the size of the second vent.

8. The electronic device as claimed in claim 6, wherein the projected size of the first vent on the printed circuit board is less than the size of the second vent.

9. The electronic device as claimed in claim 6, wherein the projected profile of the first vent on the printed circuit board is substantially equal to the profile of the second vent.

10. The electronic device as claimed in claim 6, further comprising a sound box body disposed between the second vent and the bottom casing.

11. A notebook computer with audio capability, comprising:
    a monitor;
    a host pivoting the monitor and comprising a top casing and a bottom casing opposite thereto;
    a speaker module disposed on the top casing and comprising at least one first vent; and
    a printed circuit board disposed between the top casing and the bottom casing and comprising at least one second vent corresponding to the first vent, wherein the projected profile of the first vent on the printed circuit board is substantially equal to the profile of the second vent.

12. The notebook computer as claimed in claim 11, further comprising a sound box body disposed between the second vent and the bottom casing.

13. An electronic device with audio capability, comprising:
    a host comprising a top casing and a bottom casing opposite thereto;
    a speaker module disposed on the top casing and comprising at least one first vent; and
    a printed circuit board disposed between the top casing and the bottom casing and comprising at least one second vent corresponding to the first vent, wherein the projected profile of the first vent on the printed circuit board is substantially equal to the profile of the second vent.

14. The electronic device as claimed in claim 13, further comprising a sound box body disposed between the second vent and the bottom casing.

* * * * *